United States Patent
Park et al.

(10) Patent No.: US 9,438,528 B2
(45) Date of Patent: Sep. 6, 2016

(54) METHOD AND APPARATUS FOR MANAGING DYNAMIC QUEUE IN BROADCASTING SYSTEM

(71) Applicant: Samsung Electronics Co., Ltd., Suwon-si, Gyeonggi-do (KR)

(72) Inventors: Kyung-Mo Park, Seoul (KR); Sung-Ryeul Rhyu, Yongin-si (KR); Sung-Oh Hwang, Yongin-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 14/255,391

(22) Filed: Apr. 17, 2014

(65) Prior Publication Data

US 2014/0314098 A1 Oct. 23, 2014

(30) Foreign Application Priority Data

Apr. 18, 2013 (KR) .................. 10-2013-0043229
Oct. 16, 2013 (KR) .................. 10-2013-0123478

(51) Int. Cl.
| | |
|---|---|
| H04L 12/28 | (2006.01) |
| H04L 12/863 | (2013.01) |
| H04L 29/06 | (2006.01) |
| H04L 12/18 | (2006.01) |
| H04L 12/883 | (2013.01) |
| H04N 21/238 | (2011.01) |
| H04N 21/61 | (2011.01) |

(52) U.S. Cl.
CPC ....... *H04L 47/6215* (2013.01); *H04L 12/1881* (2013.01); *H04L 47/626* (2013.01); *H04L 49/9015* (2013.01); *H04L 65/608* (2013.01); *H04L 65/80* (2013.01); *H04L 69/22* (2013.01); *H04N 21/23805* (2013.01); *H04N 21/6125* (2013.01)

(58) Field of Classification Search
USPC ....... 370/417, 389, 537, 341, 392, 395, 476, 370/396, 471, 467, 469, 460, 461; 709/231
See application file for complete search history.

(56) References Cited

U.S. PATENT DOCUMENTS

| | | | |
|---|---|---|---|
| 6,275,507 B1 * | 8/2001 | Anderson | H04N 21/2353 348/E5.005 |
| 2003/0225885 A1 * | 12/2003 | Rochberger | H04L 67/2847 709/226 |
| 2012/0185907 A1 | 7/2012 | Park et al. | |
| 2012/0320911 A1 | 12/2012 | Hwang et al. | |
| 2013/0077501 A1 | 3/2013 | Krishnaswamy et al. | |
| 2013/0081039 A1 | 3/2013 | Glew et al. | |
| 2013/0086332 A1 | 4/2013 | Mital et al. | |
| 2013/0089107 A1 | 4/2013 | Li et al. | |

FOREIGN PATENT DOCUMENTS

| | | |
|---|---|---|
| EP | 1282277 A1 | 2/2003 |
| EP | 1770905 A1 | 4/2007 |

* cited by examiner

*Primary Examiner* — Chi H Pham
*Assistant Examiner* — Alexander O Boakye
(74) *Attorney, Agent, or Firm* — Jefferson IP Law, LLP

(57) ABSTRACT

A method and an apparatus for adaptively coping with a network environment are provided. The method and apparatus includes a packet descriptor for forwarding of Media Transport (MMT) packets in a network process of a switch or a router for processing MMT packets forwarding content expressed in a structure of an MMT standard. The method of managing a queue in a broadcasting system includes receiving a Moving Picture Experts Group (MPEG) MMT packet, obtaining a header of the MMT packet, and queuing the MMT packet according to a type value of a bitrate included in the header of the MMT packet.

17 Claims, 3 Drawing Sheets

METHOD AND APPARATUS FOR MANAGING DYNAMIC QUEUE IN BROADCASTING SYSTEM

CROSS-REFERENCE TO RELATED APPLICATION(S)

This application claims the benefit under 35 U.S.C. §119 (a) of a Korean patent application filed on Apr. 18, 2013 in the Korean Intellectual Property Office and assigned Serial number 10-2013-0043229, and of a Korean patent application filed on Oct. 16, 2013 in the Korean Intellectual Property Office and assigned Serial number 10-2013-0123478, the entire disclosure of each of which is hereby incorporated by reference.

TECHNICAL FIELD

The present disclosure relates to a method and an apparatus for managing a dynamic queue for adaptive Moving Picture Experts Group (MPEG) Media Transport (MMT) packet forwarding in a broadcasting system.

BACKGROUND

In general, within the Internet environment, traffic may have various sizes and transmission speeds. In such an Internet environment, a queue manager and scheduling technique is used to smoothen flows of traffic and to efficiently manage traffic.

In the Internet environment, various kinds of content are increasing and high capacity content such as content requiring high definition and Ultra HD (UHD) content is increasing. Accordingly, data congestions on the network are gradually increasing. As a result of the increasing data congestions on the network, data sent by a server may not be normally forwarded to clients and some data may be lost in route. In general, because data is transmitted in units of packets, data losses are generated in units of packets. Thus, because receivers cannot receive packets due to loss of data on the network, data in the lost packets cannot be acquired. Therefore, the users are inconvenienced due to various reasons such as degradation of quality of audio, deterioration of screen quality of videos or broken screens, omission of captions, and loss of files. For this reason, a measure for coping with a data loss situation generated on the network is required.

Therefore, in order to accommodate an explosive increase in multimedia traffic on Internet, a queue manager and scheduling method for providing various services (e.g., Multi-Protocol Label Switching (MPLS), MPLS Virtual Private Network (VPN), Internet Protocol (IP) VPN, and Quality of Service (QoS)) while securing a rapid transmission speed is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a queue managing method and a queue managing apparatus by which Media Transport (MMT) packets can be efficiently queued.

Another aspect of the present disclosure is to provide a method and an apparatus for forwarding MMT packets by utilizing a normal link even if at least one link is down.

Another aspect of the present disclosure is to provide a method and an apparatus for adaptively allocating a packet descriptor for the forwarding of MMT packets in a network process of a switch or a router for processing MMT packets forwarding content expressed in a structure of an MMT standard.

In accordance with an aspect of the present disclosure, a method of managing a queue in a broadcasting system is provided. The method includes receiving a Moving Picture Experts Group (MPEG) MMT packet, obtaining a header of the MMT packet, and queuing the MMT packet according to a type value of a bitrate included in the header of the MMT packet.

In accordance with another aspect of the present disclosure, an apparatus of managing a queue in a broadcasting system is provided. The apparatus includes a receiving unit configured to receive a MPEG MMT packet, a packet analyzer configured to obtain a header of the MMT packet, and a packet queue managing unit configured to queue the MMT packet according to a type value of a bitrate included in the header of the MMT packet.

Another aspect of the present disclosure is to provide a method and an apparatus for efficiently queuing MMT packets in a broadcasting system.

Another aspect of the present disclosure is to provide a method and an apparatus for queuing MMT packets according to priority in a broadcasting system.

Another aspect of the present disclosure is to provide a method and an apparatus for maximizing efficient use of a packet descriptor pool and improve Quality of Service (QoS) by utilizing a normal link even if at least one link is down to adaptively allocate a packet descriptor for forwarding of MMT packets of a network interface.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
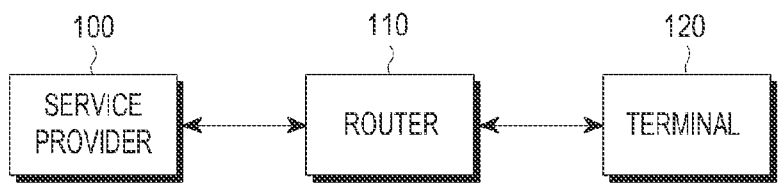
FIG. 1 is a system diagram of a broadcasting system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For convenience of description of the present disclosure, individual terms defined by 3rd Generation Partnership Project (3GPP), Moving Picture Experts Group (MPEG), Open IPTV Forum (OIPF), and Universal Plug and Play (UPnP) are used as defined, but it is apparent that the scope of the present disclosure is not limited by the standards and terms but the standards and terms may be applied to a system having a similar technical background. Hereinafter, an MPEG Media Transport (MMT) technology which is one of technologies to which the present disclosure can be applied will be described as an example in an embodiment of the present disclosure, but it is apparent that various embodiments of the present disclosure are merely an example for convenience of description and the present disclosure is not necessarily applied to the MMT technology.

Various embodiments of the present disclosure include a method and an apparatus for managing a dynamic queue for adaptive MMT packet forwarding based on a network situation in a broadcasting system.

In more detail, various embodiments of the present disclosure provide a method and an apparatus for managing a queue for adaptively or dynamically allocating a packet descriptor for MMT packet forwarding in correspondence to a network situation in a network processor of a switch or a router (hereinafter, referred to as a router) for processing MMT packets for forwarding content expressed by an MMT standard structure. Although it will be described that the method and apparatus for managing a queue according to the various embodiments of the present disclosure are applied to a switch or a router, but may be applied to a terminal which will be described below.

Various embodiments of the present disclosure provide a method and an apparatus for managing a queue by which a packet descriptor is selectively queued for MMT packet forwarding of a network interface by utilizing a port of an normal link even if at least one link is down.

FIG. 1 is a system diagram of a broadcasting system according to an embodiment of the present disclosure.

Referring to FIG. 1, the broadcasting system includes a service provider 100, a router 110, and a terminal 120.

The service provider 100 provides a broadcasting service to the terminal 120 through the router 110. Thereafter, the router 110 may transmit a received broadcasting service to the terminal 120 in the form of MMT packets.

Figure 2:
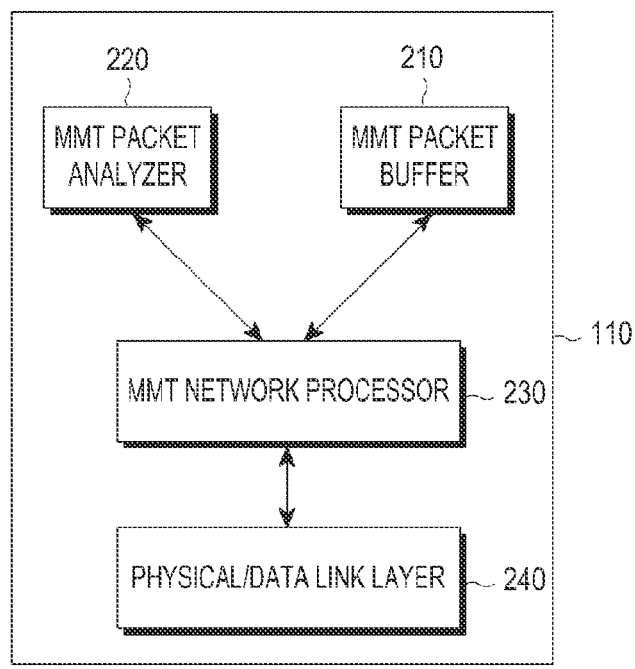
FIG. 2 is a schematic diagram of a router according to an embodiment of the present disclosure.

FIG. 2 is a schematic diagram of a router according to an embodiment of the present disclosure.

Referring to FIG. 2, the router 110 includes an MMT packet buffer 210, an MMT packet analyzer 220, an MMT network processor 230, and a physical/data link layer 240.

The physical layer/data link layer 240 is a network element for supporting a link adjusting function for various network interfaces of a router. For example, the physical layer/data link layer 240 may refer to an Ethernet Media Access Control (MAC), a POS framer, an Asynchronous Transfer Mode (ATM) framer, an HDLC controller, and/or the like.

The MMT network processor 230 processes MMT packets. For example, the MMT packets received through the physical/data link layer 240 are separated into headers and data by the MMT network processor 230. Thereafter, the separated headers and data may be transmitted to the MMT packet analyzer 220. According to various embodiments of the present disclosure, the processing procedures may be different according to the types of the MMT packets. The MMT network processor 230 may be responsible for auxiliary processing such as forwarding table lookup, security, traffic engineering, Quality of Service (QoS), and/or the like.

The MMT network processor 230 controls the MMT packet buffer 210 such that MMT packets are adaptively or dynamically stored in the MMT packet buffer 210 according to a packet analysis result of the MMT packet analyzer 220.

The MMT packet analyzer 220 stores various information such as the size of MMT packets, locations at which the MMT packets are stored, types of bitrates of the MMT packets, and forwarding tables which are necessary when the MMT packets received through the physical/data link layer 240 are processed.

The MMT packet analyzer 220 analyzes headers and data of the MMT packets received from the MMT network processor 230. After the analysis result, the MMT packet analyzer 220 may determine whether the type of bitrates of the MMT packets are a Constant Bit Rate (CBR) or a non-Constant Bit Rate (n-CBR) according to an MMT protocol of the headers. As an additional possible example, the MMT packet analyzer 220 may obtain a header of a received MMT packet from the MMT packet, determine a type value of a bitrate included in the header of the MMT packet, and determine whether the type value of the bitrate is a CBR or an n-CBR.

The MMT packet analyzer 220 informs the MMT network processor 230 of the identification result. For example, if the type value of the bitrate of the MMT Packet (MMTP) is set to '000' bit, then the bitrate of the MMTP corresponds to a CBR, and if the type value of the bitrate of the MMTP is set to '001' bit, then the bitrate of the MMTP corresponds to an n-CBR. The type of the bitrate of the MMT packet may be used to allocate the depth of the queue of the MMT packet and/or the range of the size of the MMT packet.

The header and data stored in the MMT packet analyzer 220 may be output to a determined output port with reference to a forwarding lookup table by the MMT network processor 230, or may be discarded or processed (e.g., according to an internal policy) if an MMT packet which is not present in a forwarding lookup table.

The MMT packet buffer 210 may store a packet received through the physical/data link layer 240 under the control of the MMT network processor 230. According to various embodiments of the present disclosure, the MMT packet buffer 210 may be included in the MMT network processor 230, and as illustrated in FIG. 2, the MMT packet buffer 210 may be separated from the MMT network processor 230.

Figure 3:
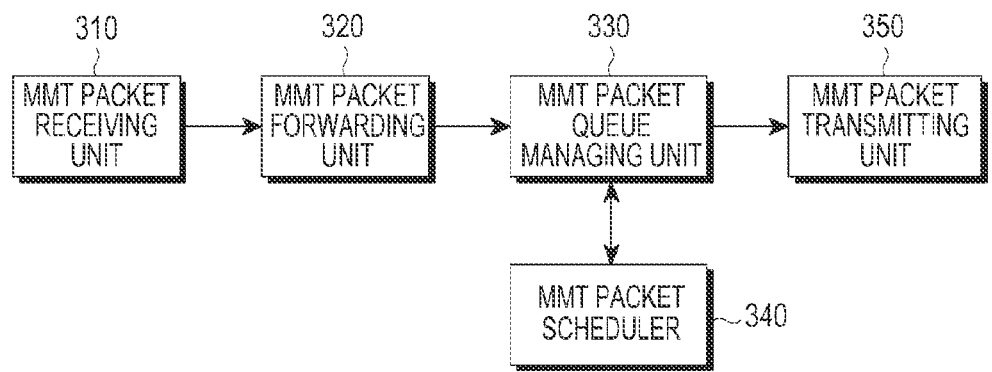
FIG. 3 is a schematic diagram of an Media Transport (MMT) network processor according to an embodiment of the present disclosure.

FIG. 3 is a detailed diagram of an MMT network processor according to an embodiment of the present disclosure.

Referring to FIG. 3, the MMT network processor 230 of FIG. 2 may include an MMT packet receiving unit 310, an MMT packet forwarding unit 320, an MMT packet queue managing unit 330, an MMT packet scheduler 340, and an MMT packet transmitting unit 350. According to various embodiments of the present disclosure, the functions of the elements of the MMT network processor 230 illustrated in FIG. 3 may include functions of the MMT packet analyzer 220, the MMT network processor 230, and the MMT packet buffer 210 of FIG. 2.

According to various embodiments of the present disclosure, the MMT packet receiving unit 310 may detect the number of ports of an MMT packet from the physical/data link layer 240, and may forward the received MMT packet to the MMT packet forwarding unit 320. According to various embodiments of the present disclosure, the MMT packet receiving unit 310 may move the received MMT packet to the MMT packet buffer 210 of FIG. 2 and may forward the MMT packet to the MMT packet analyzer 220.

The MMT packet receiving unit 310 may allocate a packet descriptor from a packet descriptor pool for the received MMT packet.

The MMT packet forwarding unit 320 may look up a forwarding lookup table for the MMT packet forwarded from the MMT packet receiving unit 310, and determine an output port (e.g., according to the look up results).

The MMT packet scheduler 340 may transmit the MMT packet to the output port selected according to an internal policy. According to various embodiments of the present disclosure, the MMT packet scheduler 340 may schedule the MMT packet by using a packet descriptor created by the MMT packet queue managing unit 330 according to an attribute value (or an MMTP). In addition, the MMT packet scheduler 340 may determine a priority of the received MMT packet, and schedules the MMT packet according to at least one of the priority and the attribute value (or MMTP). The MMT packet scheduler 340 may inform the MMT packet queue managing unit 330 of the scheduling result. According to various embodiments of the present disclosure, scheduling of the MMT packet may refer to allocation of the depth of the queue of the MMT packet and the range of the size of the MMT packet.

According to various embodiments of the present disclosure, the MMT packet queue managing unit 330 may create a packet descriptor according to the attribute value (or MMTP) of the received MMT packet.

According to various embodiments of the present disclosure, the MMT packet queue managing unit 330 may perform a function of queuing the MMT packet with queues of the MMT packet buffer 210 and the MMT packet analyzer 220 corresponding to the output port and a function of reading the MMT packet from a queue of the output port.

The MMT packet queue managing unit 330 may determine a normal state of the output port, frees (e.g., disassociates or de-maps) the packet buffer of the MMT packet analyzer 220 and the packet descriptor of the MMT packet buffer stored in the queue of the corresponding port when a link of the corresponding port is damaged, and returns the packet descriptor to a packet descriptor pool of the MMT packet buffer. The packet descriptor pool has the packet descriptor sequentially from the head to the tail, and if the MMT packet buffer 210 queues the MMT packet (e.g., in response to the MMT packet buffer 210 queuing the MMT packet), the packet descriptor pool may allocate a necessary packet descriptor according to a queuing order. The packet descriptor has a priority value determined according to a reception order of the MMT packet, and may queue or dequeue the MMT packet to and from the MMT packet analyzer 220 and the MMT packet buffer 210 according to the priority value.

Figure 4:
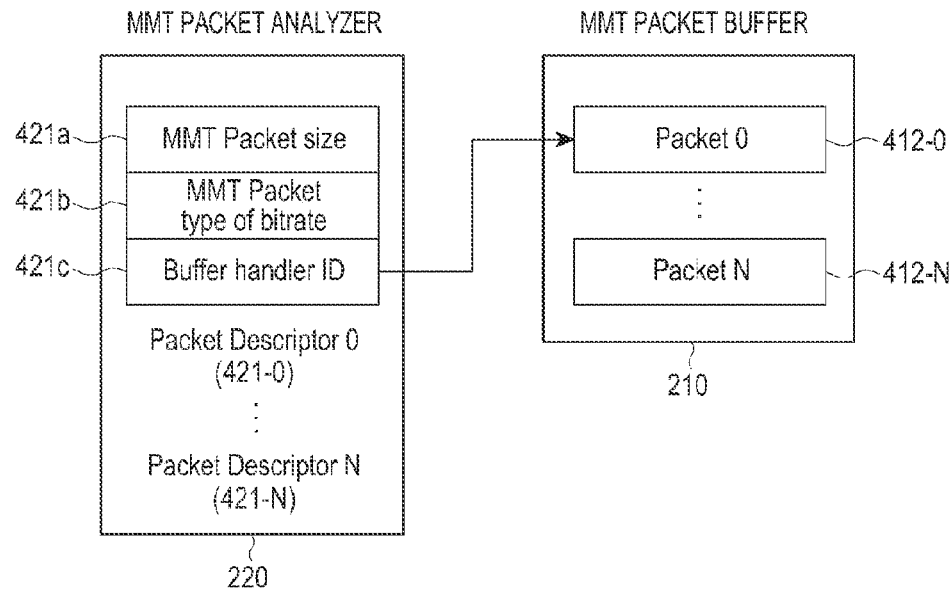
FIG. 4 is a view showing states of an MMT packet analyzer and an MMT packet buffer operated by a network processor according to an embodiment of the present disclosure.

FIG. 4 is a view showing states of an MMT packet analyzer and an MMT packet buffer operated by a network processor according to an embodiment of the present disclosure.

Referring to FIG. 4, the packet descriptor coinciding with an actual MMT packet storage area of the MMT packet buffer may be queued to the MMT packet buffer. Each of the packet descriptors 421-0, . . . , 421-N may have a size 421a of an MMT packet queued to the MMT packet analyzer 220, an address of a buffer used to store the MMT packet, and packet descriptor identification information of the next MMT packet. In addition, as illustrated in FIG. 4, each of the packet descriptors 421-0, . . . , 421-N may have information 421b relating to a bitrate of the MMT packet, and a buffer handler ID 421c.

The MMT packet transmitting unit 350 may perform a function of transmitting an MMT packet to a corresponding output port and returning a packet descriptor allocated to the transmitted MMT packet to the packet descriptor pool.

According to various embodiments of the present disclosure, the MMT packet includes data and a header.

According to various embodiments of the present disclosure, the data may include an MMT Processing Unit (MPU)/MP-4 (MPEG-4) and MMTP header. According to various embodiments of the present disclosure, the header may include an address (e.g., an IP, a MAC, and/or the like). The MPU/MP-4, the MMTP header, the IP, and the MAC may be defined as a MAC datagram, and the MPU/MP-4, the MMTP header, and the IP may be defined as an IP frame.

According to various embodiments of the present disclosure, an MMT packet may be received and an MMTP header of the MMT packet may be analyzed. According to various embodiments of the present disclosure, determination of whether the MMT packet is to be forwarded may be made based on the analysis result. If a determination is made to forward the MMT packet (e.g., in response to determining to forward the MMT packet), then the MMT packet is queued to a buffer. Thereafter, a packet descriptor is created according to an attribute value (MMTP) and the MMT packet is switched by using the packet descriptor.

According to various embodiments of the present disclosure, an MMTP header of the MMT packet is analyzed, a Type of Bitrate (TB) of the MMTP header is identified, and a determination is made as to whether the TB is a CBR or a nCBR. If the TB is determined to be an nCBR (e.g., in response to the TB being determined to be an nCBR), then the MMT network processor 230 allocates a queue according to the reception order. However, if the TB is determined to be a CBR (e.g., in response to the TB being determined to be a CBR), then the MMT network processor 230 allocates a queue having the same priority. For example, according to various embodiments of the present disclosure, a queue may be allocated according to the TB.

According to various embodiments of the present disclosure, the packet descriptors may be classified according to ports, and the packet disk MMT packet queue managing unit 330 may receive the packet descriptors 421-0, . . . , 421-N of the packet buffer of the MMT packet analyzer 220 and the MMT packet buffer 210 mapped to the buffer from a packet descriptor pool according to the priority by using the received MMT packet, an output port of which is determined by the MMT packet receiving unit 310, and the packet descriptors 421-0, . . . , 421-N may be queued to the MMT packet buffer 210. If the packet descriptor of the MMT packet buffer 210 is freed by the management procedure, and the MMT packet buffer 210 is returned to a packet descriptor pool. The packet descriptor is sequentially provided in the packet descriptor pool sequentially from the head to the tail, and if the MMT packet buffer 210 queues the MMT packet (e.g., in response to the MMT packet buffer 210 queuing the MMT packet), then the necessary packet descriptor may be allocated according to a queuing order (e.g., the packet descriptor pool may allocate the necessary packet descriptor). The packet descriptor may have a size and a buffer handler address (e.g., an address of a buffer used to store an MMT packet) of an MMT packet queued to the MMT packet analyzer 220 and packet descriptor identification information of the next MMT packet.

According to various embodiments of the present disclosure, a queue is present for each output port, and the MMT packet queue managing unit 330 connects the received MMT packet, an output port of which is determined by the MMT packet receiving unit 310, to a final part of the packet descriptor list managed by the queue of the corresponding output port. In this way, the MMT queue managing unit 330 may preserve the received MMT packet which is to be transmitted to a specific output port in a queue until a time point when the MMT packet can be transmitted by the MMT packet scheduler 340. The MMT packet queue managing unit 330 may extract a packet descriptor from the head to the tail of the queue descriptor from the queue of an output port which comes to be able to be transmitted by the MMT packet scheduler 340, and may forward the packet descriptor to the MMT packet transmitting unit 350.

Hereinafter, a queue managing method of the MMT queue managing unit 330 according to various embodiments of the present disclosure will be described.

A dynamic queue managing method for adaptive MMT packet forwarding which is performed by dynamically allocating the depths of queues by the MMT queue managing unit 330 of the network processor according to the various embodiments of the present disclosure will be described. In particular, a process of queuing an MMT packet according to various embodiments of the present disclosure after the MMT queue managing unit 330 receives a received MMT packet, an output port of which is determined by the MMT packet forwarding unit 320, will be described.

First, after receiving an MMT packet, an output port of which is determined by the MMT packet receiving unit 310, the MMT queue managing unit 330 may inspect (e.g., determine) whether a link of an output port managed by the network processor is damaged and broken. If a port has a broken link, then a descriptor is returned to a packet descriptor pool by freeing a packet buffer of an MMT packet analyzer allocated for the received MMT packets stored in a queue of the port and freeing the corresponding packet descriptor in the MMT packet buffer. Then, the received packet stored in the queue of the output port having a broken link is freed from the MMT packet buffer and the MMT packet analyzer and is discarded from the network processor.

Next, an optimum limit depth E, by which the queue corresponding to the output port can be used, is determined. Thereto, first, the number of ports having a normal link, of output ports recognized by the network processor, is calculated. If the number of output ports having a normal link is 1 or more (e.g., in response to determining that the number of ports having a normal link is 1 or more), the size of the packet descriptor pool is equally divided to the ports of a normal link, and the entire size of the packet descriptor pool is divided by the number of output ports having a normal link. The quotient determines a maximum depth N of the queue of the output port. The maximum depth N of the queue is a value by which a packet descriptor pool is equally allocated to ports.

The minimum depth L of the queue of the output port may be determined by adding the number of packet descriptors, which is to be secured according to the bandwidth of the ports, to the number of packet descriptors queued to a current output port queue. For example, the number of packet descriptors which is to be secured is 10 in the case of Fast Ethernet, and is 100 in the case of Gigabit Ethernet. The minimum depth L of the queue of the output port is the number of packet descriptors which can be adaptively stored in any case for the queue of the port having a normal link.

The utilization U of the current packet descriptor pool of the output port queue may be obtained by dividing the minimum depth L of the output port queue by the full size of the packet descriptor. The value may be used to allocate a packet descriptor pool, which is not used by the output port queue, to an output port queue according to a utilization of the packet descriptor pool.

The optimum limit depth E which can be used by the output port queue may be calculated by multiplying a value obtained by subtracting a minimum depth L from a maximum depth N of the output port queue by a utilization U of the current packet descriptor pool of the output port queue. The optimum limit depth E which can be used by an output port queue refers to the number of packet descriptors which can be maximally stored in the output port queue.

If the number of packet descriptors which are queued to a queue of the current output port is the same as a limit depth E which can be used by the queue of the output port, then the queue cannot execute queuing anymore and the MMT packet should be discarded. The optimum limit depth E which can be used by the output port queue may be determined by considering a bandwidth of the port and a utilization of the output port used as the MMT packet is forwarded, and the packet descriptor pool may be equally used in the queue of the output port.

Further, if the number of packet descriptors queued to the current output port queue is equal to or larger than the limit depth E which can be used by the output port queue, then no more packet descriptors can be queued to the output port queue. Thus, the descriptor may be returned to a packet descriptor pool by freeing the packet buffer of the MMT packet analyzer allocated for the received MMT packet and also freeing the corresponding packet descriptor. The received packet is discarded from the network processor in this way. However, because the queue of an output port having another normal link may continuously queue a packet descriptor up to a maximum depth of N, the network processor may adaptively forward an MMT packet.

However, if the depth P of the queue of the current output port is smaller than the maximum depth N, then the queue of the output port fetches a packet descriptor and queues the packet descriptor to the packet descriptor pool.

According to various embodiments of the present disclosure, if the number of output ports having a normal link is 0, then the network processor may discard all the received MMT packets are discarded. If an output port having a damaged and broken link is not present, the network processor may perform a procedure of calculating a maximum depth N and a minimum depth L of the output port queue, a utilization U of the current descriptor pool, and a limit depth E which can be used.

Figure 5:
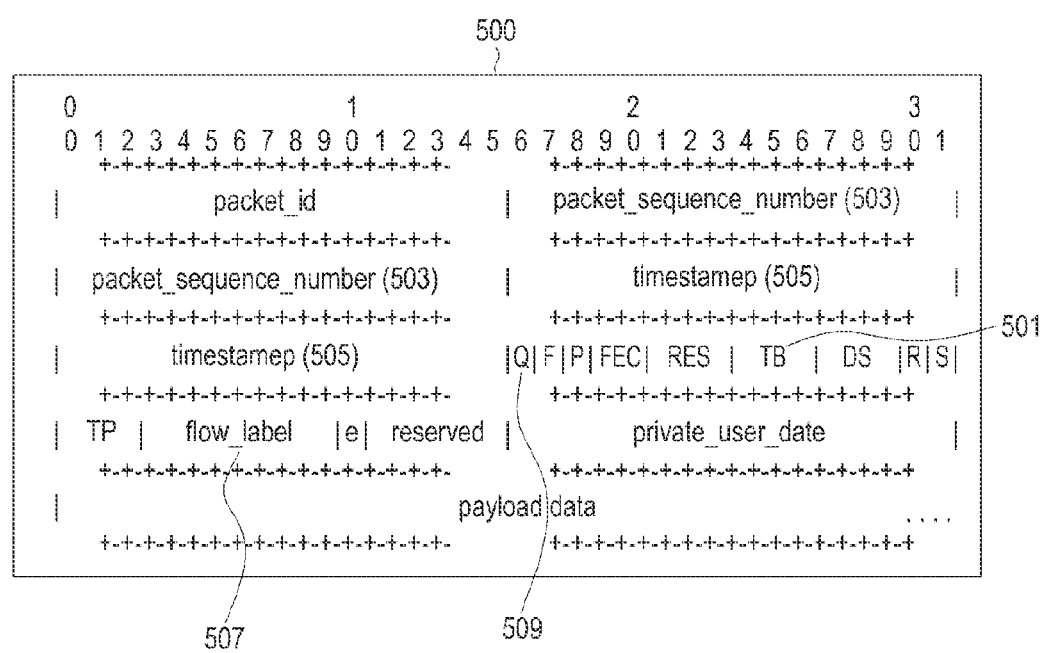
FIG. 5 is a structural view of an MMT packet for adaptive packet forwarding for allocating depths of queues by a network processor according to an embodiment of an present disclosure.

FIG. 5 is a structural view of an MMT packet for adaptive packet forwarding for allocating depths of queues by a network processor according to an embodiment of the present disclosure.

Referring to FIG. 5, a TB (type_of_bitrate) 501 refers to a type of a bitrate of an MMT packet 500 according to various embodiments of the present disclosure.

For example, if the TB 501 is set to "000" bit, then the TB 501 represents a CBR, and if the TB 501 is set to "001" bit, then the TB represents a n-CBR. The TB 501 of FIG. 5 may be used to allocate the depth of the queue of the MMT packet and/or the range of the size of the MMT packet.

A packet sequence number field 503 represents a sequence number which is a unique identification number of the transmitted MMT packet. The receiving unit may determine a presence of a loss of the corresponding packet by identifying the packet sequence number field 503.

The time stamp field 505 may be utilized to identify a creation time point of a transmitted packet. A time value included by the time stamp field is set to a value calculated based on a value set by the Internet network protocol. The receiving unit is utilized to identify the time value and to calculate a transmission time difference between packets and a packet transmission delay time between a transmitting side and a receiving side.

A flow label 507 represents a flow label for identifying a specific QoS required in a flow used to transmit data. The flow label includes, for example, a type of a packet, a delay, a throughput, and a synchronization parameter. The flow label 507 may be classified according to data transmission types. The corresponding flow label may be set through exchange of mutual reference data of a transmitting side and a receiving side before initiation of a service.

A Q field 509 includes a loss importance (priority) of the corresponding packet and a delay allowance. The corresponding information includes a loss priority and a delay allowance. The loss priority represents an importance of the corresponding packet, and represents an importance in loss in a section of a predetermined range.

Figure 6:
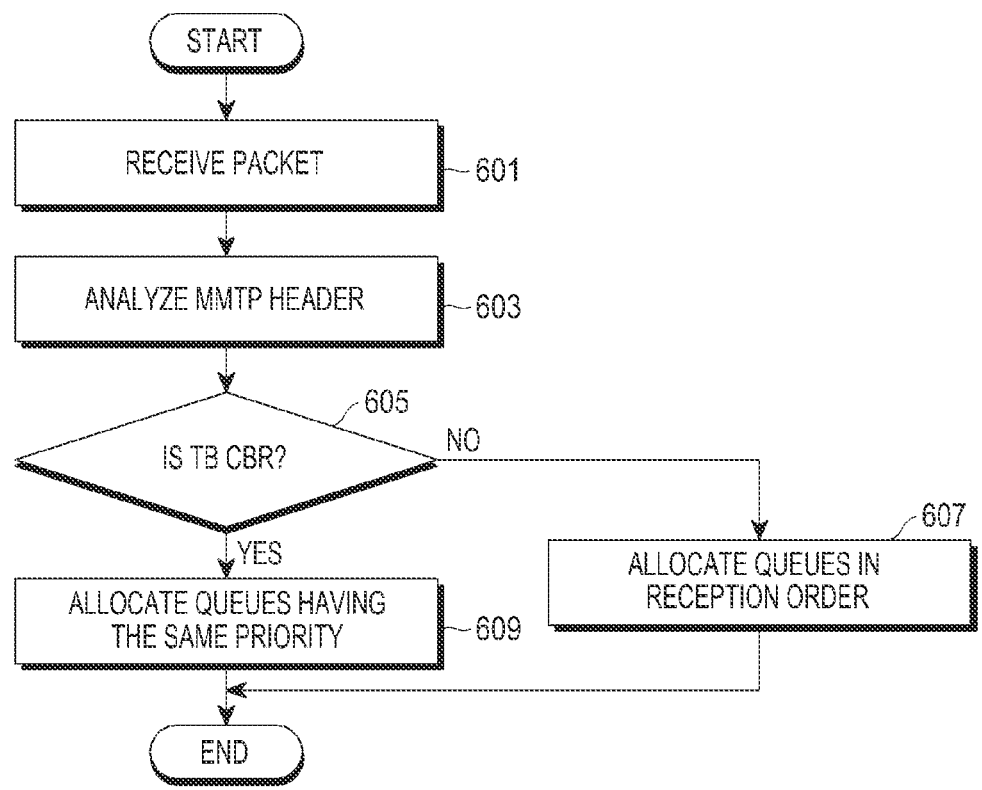
FIG. 6 is a flowchart showing a queue managing method according to an embodiment of the present disclosure.

FIG. 6 is a flowchart showing a queue managing method according to an embodiment of the present disclosure.

Referring to FIG. 6, at operation 601, the router receives an MMT packet from a service provider.

At operation 603, the router analyzes an MMTP header of the received MMT packet. According to various embodiments of the present disclosure, the router may obtain TB information included in the MMTP header from the received MMT packet.

At operation 605, the router identifies a TB of the MMTP header of the MMT packet and determines whether the TB is a CBR through an analysis.

If the router determines that the TB is not a CBR at operation 605, then the router proceeds to operation 607 at which the router allocates a queue according to a reception order.

However, if the router determines that the TB is a CBR at operation 605, then the router proceeds to operation 609 at which the router allocates a queue having the same priority. For example, if the TB is a CBR, then the router allocates a queue such that the MMT packets have the same priority. According to various embodiments of the present disclosure, if the TB is a CBR, then the router allocates a packet descriptor having the same priority. According to various embodiments of the present disclosure, the router may allocate a queue twice for an MMT packet having a high priority.

As described above, according to the present disclosure, even if at least one link is down, a packet descriptor is adaptively allocated for forwarding of an MMT packet of a LAN/WAN interface by utilizing another normal link.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit scope and scope of the present disclosure as defined by the appended claims and their equivalents.

What is claimed is:

1. A method of managing a queue in a broadcasting system, the method comprising:
   receiving a packet;
   obtaining a header of the packet;
   identifying whether a type value of a bit rate included in the header corresponds to a constant bit rate (CBR) or a non-constant bit rate (nCBR); and
   queuing the packet according to the type value of the bit rate.

2. The method of claim 1, wherein the header of the packet comprises a moving picture experts group (MPEG) media transport protocol (MMTP) header.

3. The method of claim 1, wherein if the type value of the bit rate is a value indicating that the bit rate corresponds to the CBR, then queues are allocated such that a plurality of received packets have the same priority.

4. The method of claim 1, wherein if the type value of the bit rate is a value indicating that the bit rate corresponds to the non-CBR, then queues are allocated in a reception order of packets.

5. The method of claim 1, further comprising:
generating a packet descriptor according to an attribute value included in the header of the packet.

6. The method of claim 1, further comprising:
identifying ports for which a link is damaged.

7. The method of claim 6, further comprising:
freeing a packet buffer stored in a queue of a port determined to have a link that is damaged.

8. A non-transitory computer-readable storage medium storing instructions that, when executed, cause at least one processor to perform the method of claim 1.

9. The method of claim 1, wherein the packet includes a moving picture experts group (MPEG) media transport (MMT) packet.

10. An apparatus of managing a queue in a broadcasting system, the apparatus comprising:
a receiving unit configured to receive a packet;
a packet analyzer configured to obtain a header of the packet; and
a packet queue managing unit configured to queue the packet according to the type value of the bit rate,
wherein the packet analyzer is further configured to identify whether the type value of the bit rate included in the header corresponds to a constant bit rate (CBR) or a non-constant bit rate (nCBR).

11. The apparatus of claim 10, wherein the header of the packet comprises a moving picture experts group (MPEG) media transport protocol (MMTP) header.

12. The apparatus of claim 10, wherein if the type value of the bit rate is a value indicating that the bit rate corresponds to a CBR, then a queue is allocated such that a plurality of received packets have the same priority.

13. The apparatus of claim 10, wherein if the type value of the bit rate is a value indicating that the bit rate corresponds to a nCBR, then queues are allocated in a reception order of packets.

14. The apparatus of claim 10, wherein the packet queue managing unit is further configured to generate a packet descriptor according to an attribute value included in the header of the packet.

15. The apparatus of claim 10, wherein the packet queue managing unit is further configured to identify ports for which a link is damaged.

16. The apparatus of claim 15, wherein the packet queue managing unit is further configured to free a packet buffer stored in a queue of a port determined to have a link that is damaged.

17. The apparatus of claim 10, wherein the packet includes a moving picture experts group (MPEG) media transport (MMT) packet.

* * * * *